United States Patent

Weinhold

[11] Patent Number: 5,314,215
[45] Date of Patent: May 24, 1994

[54] FLANGE RING

[76] Inventor: Karl Weinhold, Im Jagdfeld 43, D-4040 Neuss 1, Fed. Rep. of Germany

[21] Appl. No.: 912,485

[22] Filed: Jul. 13, 1992

[30] Foreign Application Priority Data

Jul. 18, 1991 [DE] Fed. Rep. of Germany ....... 4123806

[51] Int. Cl.⁵ .................. F16L 35/00; F16L 23/032
[52] U.S. Cl. ................................. 285/283; 285/368; 285/412; 285/415
[58] Field of Search ............... 285/283, 368, 412, 414, 285/415

[56] References Cited

U.S. PATENT DOCUMENTS

| | | | |
|---|---|---|---|
| 335,592 | 2/1886 | Worth | 285/368 |
| 570,975 | 11/1896 | Anderson | 285/412 |
| 2,911,239 | 11/1959 | Marzolf, Sr. | 285/415 |
| 3,175,851 | 3/1965 | McMurray | 285/368 X |
| 3,515,416 | 6/1970 | Pickert et al. | |
| 3,549,179 | 12/1970 | Cox | 285/368 X |
| 3,587,010 | 6/1971 | Walsh | 285/368 X |
| 3,895,833 | 7/1975 | Thiessen | |
| 4,519,639 | 5/1985 | Florian | 285/412 X |

FOREIGN PATENT DOCUMENTS

| | | | |
|---|---|---|---|
| 352875 | 5/1922 | Fed. Rep. of Germany | 285/368 |
| 1059727 | 6/1959 | Fed. Rep. of Germany | 285/283 |
| 2529138 | 7/1976 | Fed. Rep. of Germany | |
| 8600971 | 2/1986 | PCT Int'l Appl. | |

Primary Examiner—Randolph A. Reese
Assistant Examiner—Heather Chun
Attorney, Agent, or Firm—Meltzer, Lippe, Goldstein, Wolf, Schlissel & Sazer

[57] ABSTRACT

The invention relates to a flange ring which is divided in two along a plane extending in the axial direction and wherein, in the zone of the two abutment places each flange half has a bolt at one abutment place and a pocket at the other, so that the bolt on one flange half engages positively in the pocket of the other flange half, the flange ring being formed with holes in both flange halves for the passage of the fastening screws. The characterizing feature of the invention is that the flange ring is divided in the center into two identical halves (1a, 1b) and the bolt (8) so engages positively behind the pocket (9) that the flange halves (1a, 1b) are joined together in the bent state, and after being joined together the flange halves (1a, 1b) cannot be separated in the radial direction with the flange ring (1) flat.

6 Claims, 3 Drawing Sheets

A-B

E-F

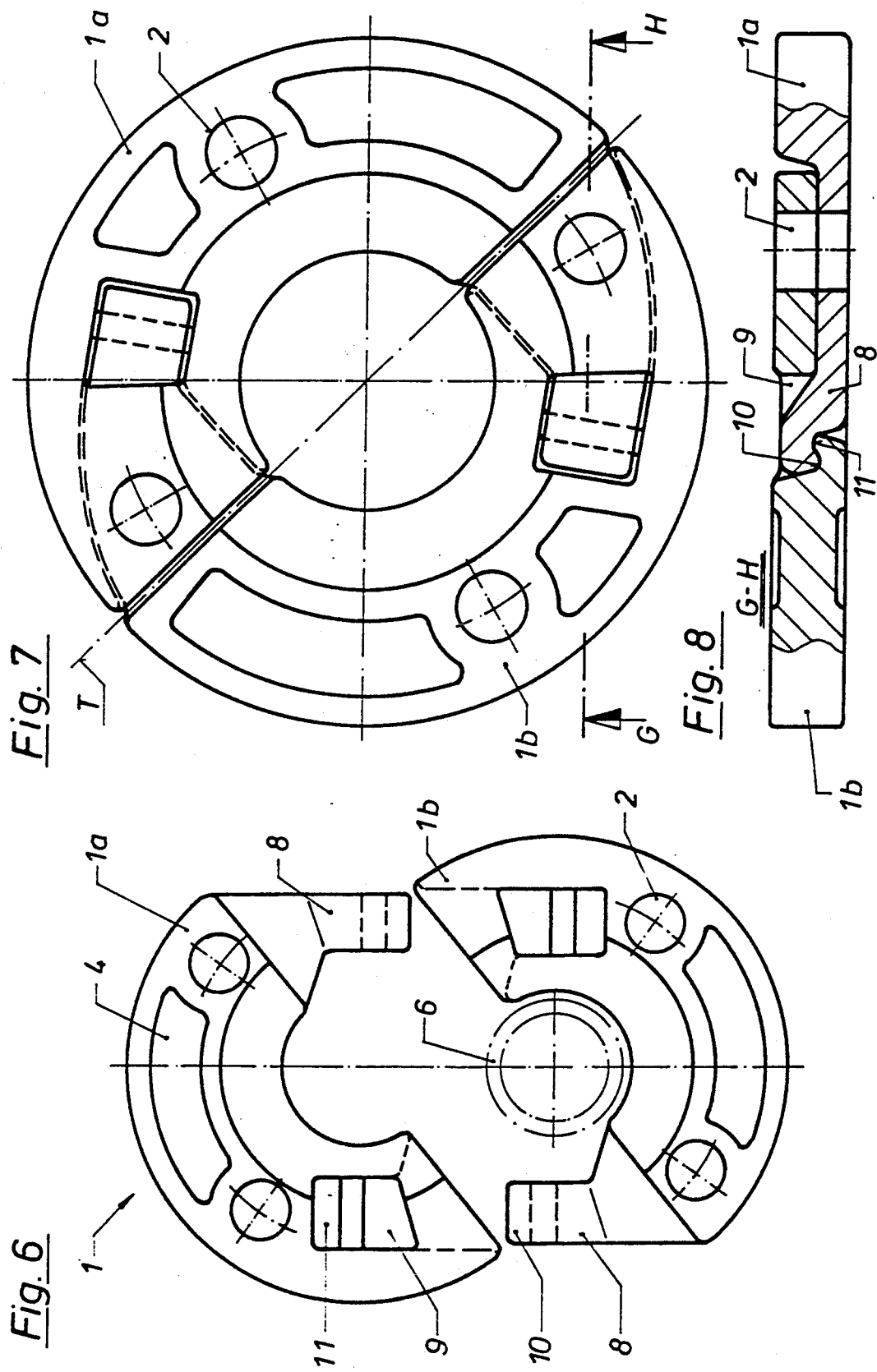

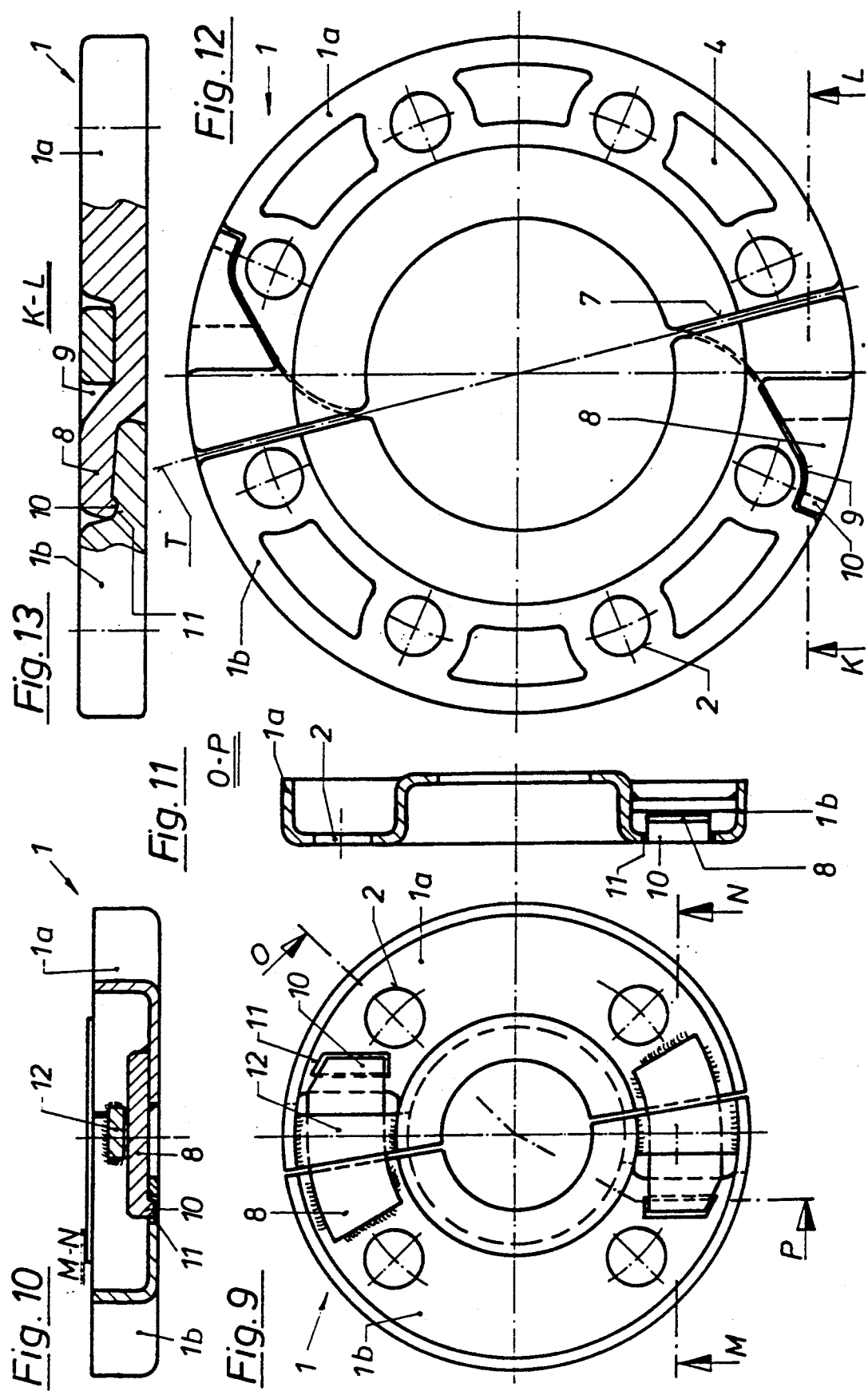

FLANGE RING

FIELD OF THE INVENTION

The invention relates to a flange ring which is divided in two along a plane extending in the axial direction and wherein, in the zone of the two abutment places each flange half has a bolt at one abutment place and a pocket at the other, so that the bolt on one flange half engages positively in the pocket of the other flange half, the flange ring being formed with holes in both flange halves for the passage of the fastening screws. Such flange rings are known, for instance, from U.S Pat. No. 3,515,416.

It is an object of the invention so to improve a flange ring of the kind specified as to facilitate its manipulability and enhance its stability.

SUMMARY OF THE INVENTION

To solve this problem in the flange ring of the kind specified according to the invention the flange ring is divided in the centre into two identical halves and the bolt so engages positively behind the pocket that the flange halves are joined together in the bent state, and after being joined together the flange halves cannot be separated in the radial direction with the flange ring flat.

The feature that the flange ring is divided in the centre into two identical halves produces two laterally inverted equal ring halves, in which case the dividing plane lies in an axial plane. According to the invention the bolt so engages positively behind the pocket that the flange halves are joined together in the bent condition, and when the flange halves have been joined together, they cannot be separated in the radial direction when the flange ring is flat. To enable the bolt to engage positively behind the pocket, the two ring halves must be inserted in one another in the bent condition and then tilted into the common flange ring plane, so that the bolt engages behind the pocket and the ring halves are prevented from being separated radially. The flange ring can then be aligned by turning on the tube into the fastening position. As usual, the fastening screws are inserted through the screw holes in the flange ring and tightened. The flange ring behaves like a one-piece ring—i.e., it can therefore be equally readily handled and has the same high stability.

Preferably the bolt has one or more lugs which engage in correspondingly shaped recesses in the other flange ring half.

According to another advantageous possible feature of the flange ring according to the invention, the pocket is formed by a radially extending bowed member behind which the bolt engages. Preferably the bowed member can be formed by the production of two parallel incisions in the flange half and pressing out to form an insertion opening for the bolt. This construction can be recommended for thin-walled sheet metal rings. With a heavier link forging construction the pocket and bolt are most conveniently formed on or in during forging. In the case of thinner flange dimensions the bowed member can also be formed by a welded-on strap, as will be explained in greater detail with reference to an embodiment illustrated in the drawings.

Also in the flange ring according to the invention preferably at least when the flange halves are joined together, at least two of the holes for the passage of the fastening screws in each flange half are in alignment with two holes in the other flange half in the zone of the bolts. When then fastening screws are inserted through the aligned holes, the two flange halves are interconnected by means of the screw. Without loosening the screws the flange halves can no longer be separated from one another. In this way a double positive connection can be achieved, namely on the one hand the connection via the engagement of the bolt in the pocket, and on the other hand the engagement achieved by the screws.

After a flange connection which has been produced using flange rings according to the invention has been loosened, the flange can simply be removed from the tube. To this end the two flange ring halves are drawn apart, the bolt becoming disengaged from the pocket. At the same time the tube must not change its position.

Normally loose flanges are already pushed over the tube during the transportation of a tubing portion. This often causes damage during transport. The flange ring may move on the tubing portion and scratch the tube or cause grooves by bending. It can become bent or damaged itself or when the tubing portion is deposited on the ground. The invention enables the tubing portion to be transported without carrying the flange ring, which is applied only at the place of use. This enables damage during transport to be effectively avoided. Moreover, the tubing portions can also be more densely stacked during transportation, since the distance between the stacked tubing portions is no longer determined by the maximum diameter of the flange ring, but by the collar provided at the tubing portion ends, which has a smaller diameter than the flange ring.

What is more, due to the aforementioned interengagement of the two flange ring halves, the flange ring according to the invention can be readily manipulated during mounting and demounting and has the same stability as a one-piece flange.

DESCRIPTION OF THE DRAWINGS

The invention will be explained in greater detail with reference to embodiments thereof illustrated in the drawings, wherein:

FIG. 6 is a view of two laterally inverted identical ring halves in a position removed from one another, FIG. 7 is a view similar to FIG. 6, showing a flange comprising two ring halves in the assembled position, FIG. 8 is a section G-H in FIG. 7, FIG. 9 is a view of another embodiment of a flange ring according to the invention, FIG. 10 is a section M-N in FIG. 9 and FIG. 11 is a section O-P in FIG. 9, FIG. 12 is a view of another embodiment of a flange ring according to the invention, and FIG. 13 is a section taken along the line K-L in FIG. 12.

In the drawings like elements have like references.

DETAILED DESCRIPTION OF THE DRAWINGS

Figure 1:
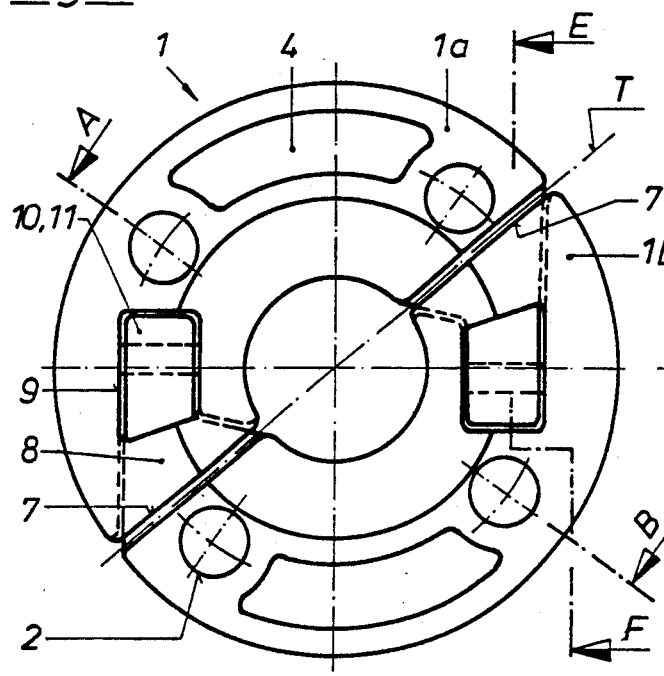
FIG. 1 is a view of a two-part flange ring.
Figure 2:
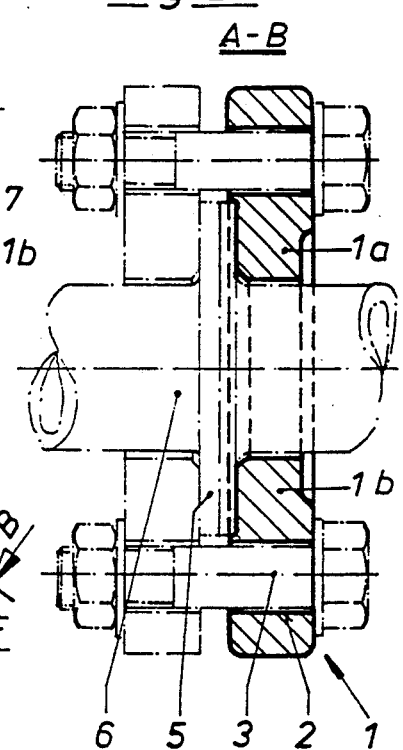
FIG. 2 is a longitudinal section A-B taken through the flange connection shown in FIG. 1.

In the embodiments illustrated in the drawings a flange ring 1 consists of two laterally inverted identical halves 1a, 1b. The dividing plane T of the flange ring 1 extends in an axial plane, so that each flange half 1a, 1b forms a half of the ring.

Each flange half 1a, 1b is formed with holes 2 through which fastening screws 3 extend. Reinforcing beads 4 can be formed between the holes 2.

The loose flange ring 1 is applied from behind against an annular collar 5 formed at the ends of a tube 6.

Each flange half 1a, 1b has a bolt 8 at one abutment place 7 with the other flange half 1a, 1b and a pocket 9 at the other abutment place 7. The pockets are constructed to match the shape of the bolt. When the flange ring 1 is joined, therefore, each bolt 8 engages in the pocket 9 of the opposite flange half 1a, 1b, as shown most clearly in FIG. 1. As a result the flange halves 1a, 1b are interconnected to form the flange ring 1. When joined together, therefore, they form a structural unit and stabilize the flange ring 1 in its plane.

Figure 3:
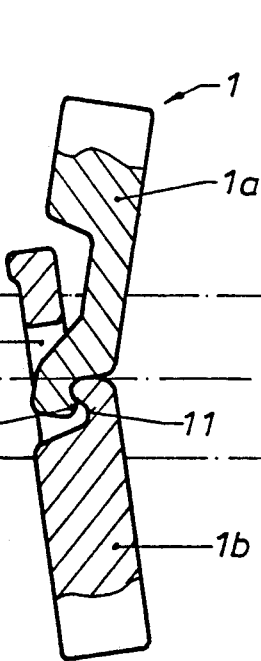
FIG. 3 is a section E-F (FIG. 3) in the position ready for mounting.

To prevent the two flange halves 1a, 1b from being easily drawn apart in the radial direction after joining, the halves are bent. To this end the bolt 8 has a lug 10 via which it engages in a matching recess 11 inside the pocket 9 when the two flange halves 1a, 1b are lying in one plane (FIG. 3). This connection can also be referred to as a hook-like engagement.

Figure 4:
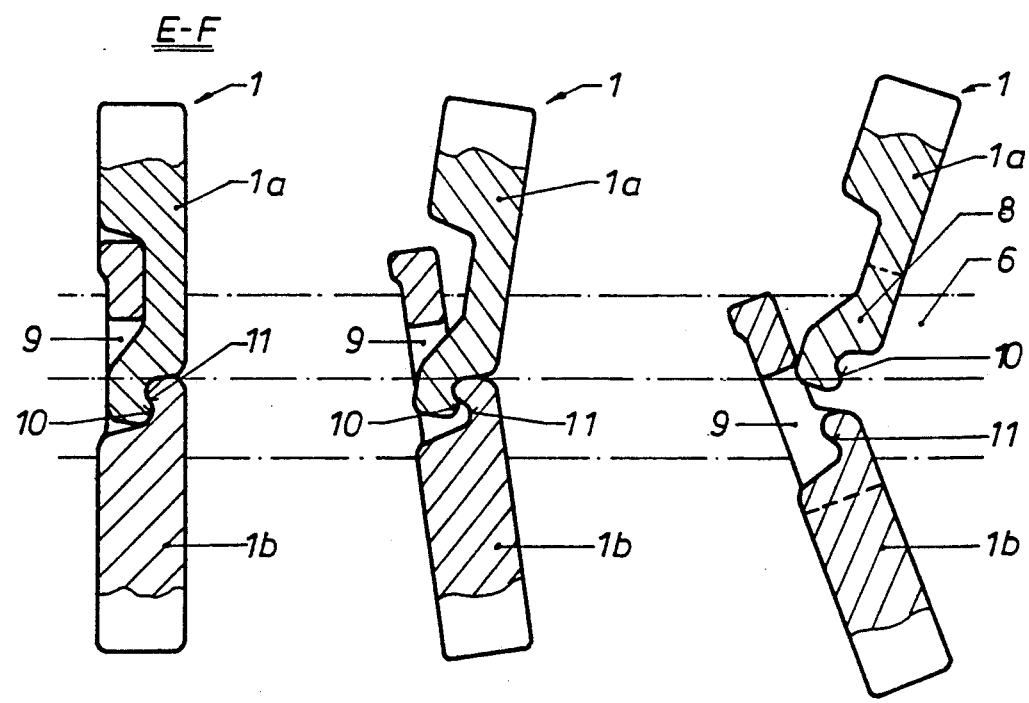
FIG. 4 shows the ring in a bent intermediate position during mounting or demounting and FIG. 5 shows the ring in a position in which the two ring halves are in the bent position shortly prior to engagement.
Figure 5:
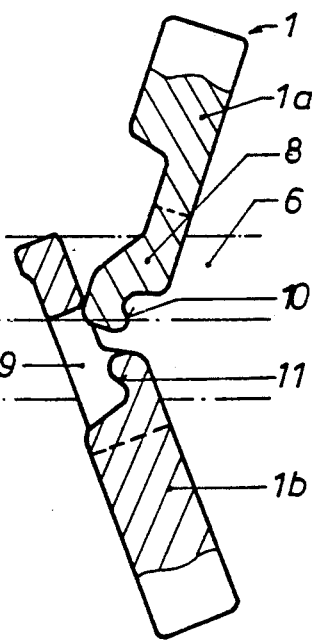

The flange halves 1a, 1b can be mounted and demounted only by bending the two halves in relation to one another, as shown clearly in FIGS. 4 and 5. First during mounting the flange halves 1a, 1b are moved towards one another (FIG. 5), the bolt 8 is introduced into the opening of the pocket 9 of the opposite flange half 1b, and then the two flange halves 1a, 1b are tilted into the plane of the flange. FIG. 4 shows an intermediate position and FIG. 3 the final position. The flange halves 1a, 1b are demounted in the converse sequence, starting from FIG. 3 and moving via FIG. 4 to FIG. 5.

The embodiment illustrated in FIGS. 7 and 8 differs from that illustrated in FIGS. 1 to 6 by the shape of the bolt, the position of the pockets and the feature that two diametrically opposite holes 2 are in alignment in the zone of the bolt 8 and the pocket 9. The two flange halves 1a, 1b overlap one another by the bolt 8 to such an extent that in the overlapping zone a hole can be provided in both flange halves. As a result, when the fastening screws 3 have been inserted through the holes 2, the two flange halves 1a, 1b can no longer be separated from one another.

FIGS. 9 to 11 show a press flange in which the bolt 8 is welded on. The pocket is formed by a bowed member 12, which is welded on to each other flange half 1a, 1b. The recess 11 into which the bolt 8 engages via lug 10 takes the form of a cutaway portion in the plane of the flange half 1a, 1b.

In the embodiment of the flange ring 1 illustrated in FIGS. 12 and 13 the bolts 8 and pockets 9 extend as far as the periphery of the flange ring 1.

What is claimed is:

1. A flange ring which is divided along a plane extending in an axial direction into two identical flange halves each of which has two abutment places, each flange half having a bolt at one of said abutment places and a pocket at the other of said abutment places, so that the bolt of each flange half positively engages in the pocket of the other flange half, the bolt and the pocket of each flange half having means configured so that said two flange halves can only be joined or disengaged by tilting said flange halves out of a plane formed by said two flange halves when they are engaged.

2. The flange ring of claim 1 wherein the pocket of each flange half comprises an upper surface and a recess behind said upper surface, wherein the bolt of each flange half engages into said recess behind said upper surface of said pocket.

3. The flange ring of claim 2 wherein each flange half has holes therein for the passage of fastening screws.

4. The flange ring of claim 3 wherein each bolt has a lug which engages in a correspondingly-shaped recess in the pocket of the other flange half.

5. The flange ring of claim 4 wherein said pocket comprises a radially extending bowed member.

6. The flange ring of claim 5 comprising at least two holes in each flange half, said two holes of each flange half being aligned for the passage of said fastening screws when said two flange halves are engaged with each other.

* * * * *